United States Patent [19]

Kappler et al.

[11] Patent Number: 5,079,320

[45] Date of Patent: Jan. 7, 1992

[54] CROSS-LINKABLE FLUORINATED COPOLYMER, PROCESS FOR ITS MANUFACTURE AND ITS APPLICATION IN PROTECTIVE COATINGS

[75] Inventors: Patrick Kappler, Ecully; Jean-Luc Perillon, Bernay, both of France

[73] Assignee: Atochem, Paris La Defense, France

[21] Appl. No.: 611,934

[22] Filed: Nov. 9, 1990

[30] Foreign Application Priority Data

Nov. 16, 1989 [FR] France ................ 89 15029

[51] Int. Cl.$^5$ ............................ C08F 214/18
[52] U.S. Cl. ..................... 526/249; 526/250; 526/253; 526/255; 526/332; 526/333
[58] Field of Search ........... 526/255, 249, 332, 333, 526/250, 253

[56] References Cited

U.S. PATENT DOCUMENTS

| | | | |
|---|---|---|---|
| 4,387,204 | 6/1983 | Zahir et al. | 526/255 |
| 4,631,326 | 12/1986 | Koishi et al. | 526/249 |
| 4,640,966 | 2/1987 | Mitani et al. | 526/255 |
| 4,788,266 | 11/1988 | Koishi et al. | 526/332 |
| 4,954,589 | 9/1990 | Sugawara et al. | 526/255 |
| 4,985,519 | 1/1991 | Koishi et al. | 526/255 |

FOREIGN PATENT DOCUMENTS 3700548 7/1988 Fed. Rep. of Germany ...... 526/255
2218707 11/1989 United Kingdom .

OTHER PUBLICATIONS

J01060616, "Fluorine-Containing Copolymer Preparation" Nippon 89/3/7.
J63283929 "Heat-Shrinkage Tube" Hitachi 88/11/21.

*Primary Examiner*—Joseph L. Schofer
*Assistant Examiner*—N. Sarofim

[57] ABSTRACT

A cross-linkable copolymer formed by polymerizing in solution vinylidene fluoride, tetrafluoroethylene, an allyl ether, and a vinyl ether and protective coating prepared utilizing such copolymer.

7 Claims, No Drawings

CROSS-LINKABLE FLUORINATED COPOLYMER, PROCESS FOR ITS MANUFACTURE AND ITS APPLICATION IN PROTECTIVE COATINGS

BACKGROUND OF THE INVENTION

The present invention pertains to a hardenable fluorinated copolymer of vinylidene fluoride ($C_2H_2F_2$) and tetrafluoroethylene ($C_2F_4$), a hydroxylated allyl ether and a vinyl ether. This copolymer, which is soluble in organic solvents, is particularly recommended for the manufacture of protective coatings, i.e. paints and varnishes.

The fluorinated polymers are known for their good mechanical properties and their excellent resistance to chemical products and weather. However, their lack of solubility in conventional solvents makes them unusable for certain applications such as, for example, resin for paints and varnishes where their properties are sought for the manufacture of coatings with good resistance and easy maintenance.

In order to benefit from these properties of the fluorinated polymers while avoiding their drawbacks, means have been sought to make them soluble in the conventional organic solvents. In order to accomplish this, it is known to decrease the crystallinity of fluorinated polymers by copolymerization of ethylenically unsaturated monomers at least one of which is fluorinated.

In addition, to use such copolymers it is desirable for certain applications, particularly for their use in the manufacture of paints and varnishes, to preserve for them a sufficient degree of rigidity and to make them hardenable by incorporating functional groups into their structure.

Such cross-linkable fluorinated copolymers are described in French patents 2,597,873 and 2,569,703. These products are obtained by copolymerization of chlorotrifluoroethylene, fatty acid ester and hydroxylated or ethoxylated allylglycidyl ether. These copolymers may possibly contain less than 20% of another nonfluorinated comonomer. If these copolymers contain more than 20% of the previously mentioned comonomer, they lose their solubility in the solvents as well as their transparency. In addition, the introduction of the fluorine by the use of $C_2F_3Cl$ alone, also brings along the chlorine atom which is not desirable in large amounts with regard to optical properties and resistance to corrosion.

In Japanese publication 59-174,657/84, there is also described a hardenable, cross-linkable copolymer based on vinylidene fluoride, tetrafluoroethylene, chlorotrifluoroethylene, a vinyl ester and a hydroxylation agent. This copolymer, which contains 5 to 80% of chlorotrifluoroethylene groups and is based on vinyl ester, has the drawback that after hydrolysis it provides a very strongly colored copolymer solution which damages the transparency of the varnishes subsequently created from this product.

SUMMARY OF THE INVENTION

The object of the present invention is a fluorinated copolymer which is easily heat-hardenable in the possible presence of a hardening agent. This copolymer in solution in a solvent which is suitable for this application can be used as a paint or varnish to create coatings which are hard, stable and transparent in the absence of pigments, and which have excellent adherence on metals, glass, wood, cement, plastics, etc.

The cross-linkable copolymer in accordance with the invention, which contains copolymerization radicals from a fluorinated monomer and a hydroxylated allyl ether and a vinyl ether, is characterized in that:

(a) the fluorinated monomer radicals originate from the association of vinylidene fluoride and tetrafluoroethylene, (b) the allyl ether radicals originate from a compound of formula:

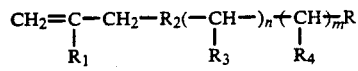

wherein R is $CH_2OH$; $R_1$ is H or $CH_3$; $R_2$ is

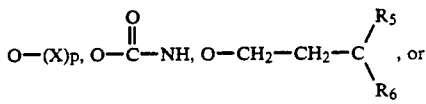

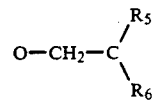

with "p" being a number selected 0 to 3, and x being $(CH_2)_q$—O with "q" being a number selected from 1 to 3, and $R_5$ and $R_6$, which can be the same or different, being:

$CH_2OH$, $CH_2$—$CH_2$—OH, $CH_3$, $C_2H_5$; $R_3$ and $R_4$ being H or OH but not simultaneously H; and "n" and "m", which can be the same or different, being numbers selected from 0 to 2; and (c) the vinyl ether radicals originating from a compound of formula: $CH_2$=$CH$—O—$R_7$, wherein $R_7$ is a linear or branched alkyl radical containing 2 to 8, preferably 2 to 4, carbon radicals, or a cyclic radical.

The invention also comprises the process for making such copolymers and protective coatings containing the same as hereinafter described.

DETAILED DESCRIPTION

With respect to the copolymers, the association for 100 moles of the ensemble of the two fluorinated monomers is usually:

(i) 75 to 25 moles of vinylidene fluoride, and
(ii) 75 to 25 moles of tetrafluoroethylene.

Preferably, the fluorinated cross-linkable copolymer in accordance with the invention is characterized in that it comprises monomer radicals originating from:

(i) 75 to 25 moles, preferably 70 to 50 moles, of vinylidene fluoride,
(ii) 75 to 25 moles, preferably 50 to 30 moles, of tetrafluoroethylene,
(iii) 4 to 15 moles, preferably 5 to 10 moles, of the aforementioned allyl ether per 100 moles of the ensemble of the two fluorinated monomers, and
(iv) 3 to 35 moles, preferably 5 to 20 moles of the aforementioned vinyl ether per 100 moles of the ensemble of the two fluorinated monomers.

Among the preferred allyl ethers can be cited the compounds of formula:

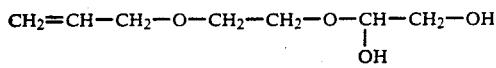

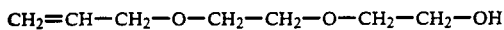

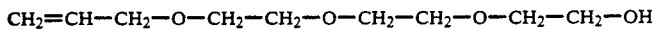

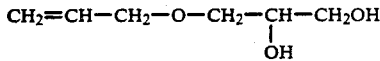

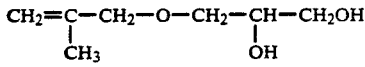

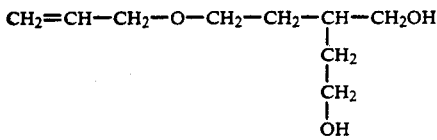

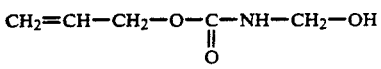

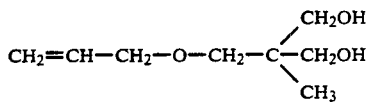

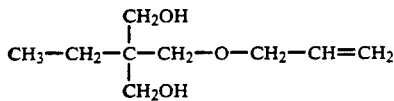

Among the preferred alkylvinyl ethers can be cited: ethylvinyl ether, butylvinyl ether, isobutylvinyl ether, isopropylvinyl ether, propylvinyl ether, ethyl 2-hexylvinyl ether. Cyclohexylvinyl ether can be cited from among the cyclic vinyl ethers. A mixture of two vinyl ethers can also be used.

In order that these copolymers can be used in a liquid coating composition such as paint or varnish, it is recommended that the inherent viscosity of the copolymer dissolved in dimethylformamide (DMF) at 25° C. at a concentration of 1 g/dL be in the range of values from 0.06 to 0.9 dL/g.

The copolymer in accordance with the invention is usually obtained using a solution polymerization procedure. The procedure is comprised of copolymerizing the monomers in a solvent medium in the presence of an organosoluble initiator at a temperature between ca. 30° and 120° C., preferably between 40° and 80° C., under a pressure of ca. 10 to 80 bars, preferably between 15 and 40 bars.

In accordance with the invention, the cross-linkable copolymer is obtained by copolymerization of vinylidene fluoride and tetrafluoroethylene, allyl ether and vinyl ether such as previously defined. For 100 moles of polymerized fluorinated monomers, the following are employed:

(i) 75 to 25 moles of vinylidene fluoride, (ii) 75 to 25 moles of tetrafluoroethylene, with which are associated the allyl ether and vinyl ether as already defined.

In order to obtain a cross-linkable copolymer which has the best properties, one usually associates from 4 to 15 moles of allyl ether and 3 to 35 moles of vinyl ether as defined per 100 moles of the total of the two fluorinated monomers.

In accordance with a preferred mode of copolymerization, the solvent is heated to the selected reaction temperature in the reaction zone, an agitated reactor that has been degassed in advance. The reactants, a mixture of fluorinated monomer as well as an initial fraction of allyl ether and vinyl ether are then introduced into the reactor.

The amount of monomer mixture to be introduced so as to reach the selected reaction pressure depends on the solubility conditions of the fluorinated monomers in the selected solvent. The monomers solvent weight ratio is generally between 0.1 and 1.

When the reaction pressure and reaction temperature are reached, the polymerization initiator is introduced into the reactor. The formation of polymer is manifested by a fall in pressure which is compensated by addition of fluorinated monomer mixture.

One can add a mixture of fluorinated monomers with a molar composition identical to that which was initially introduced. One can also take into account the characteristic reactivity of each monomer and adjust the composition of the mixture during the progression of the polymerization in order to create a copolymer which is homogeneous in composition.

The allyl and vinyl ether compositions can also be added during the progression of the polymerization. They can also be added as a mixture or separately, in association or not with the additions of the fluorinated monomers.

The allyl and vinyl ether derivatives are added in a manner such that the composition of the mixture of fluorinated monomers and allyl and vinyl allyl derivatives remains constant during the entire duration of the polymerization.

The addition of the monomer mixture for maintaining the pressure is continued for a sufficiently prolonged period of time to reach a dry extract on the order of 10 to 60%, preferably 15 to 40%.

The residual volatile reagents can be eliminated by degassing.

The final solution is extracted from the reactor and can be stored in that form. It can also be concentrated immediately or subsequently so as to obtain the amount of dry extract selected for the employment of the copolymer.

The solvents selected for the copolymerization reaction must make it possible to solubilize the monomer mixture while remaining inert in relation to the other reactional components. They are preferably selected from among the acetates and alcohols. Butyl acetate, isobutyl acetate and ethyl acetate are particularly appropriate among the preferred acetates. Methanol and tertiobutanol can be cited among the preferred alcohols.

Association in the reaction medium of a third fluorinated monomer, without chlorine in its molecule, is not to be excluded. This can be, for example, hexafluoropropene. The amount of the third fluorinated monomer cannot, however, be greater than 15 moles per 100 moles of the ensemble of the two monomers, vinylidene fluoride and tetrafluoroethylene.

The copolymerization initiators are known in themselves. The most common are selected from among the radical polymerization initiators such as the perdicarbonates, the perpivalates and the azo compounds, such as diisopropyl or dicyclohexyl percarbonate, tertiobutyl or tertioamyl perpivalate, azobisisobutyronitrile and azobis-2,2-dimethylvaleronitrile.

Taking into account the transfer agent effect of the cited solvents and initiators, the molecular weights of the polymers obtained are relatively low. The number-average molecular weights ($\overline{Mn}$) of the cross-linkable copolymers obtained are, preferably, between 1000 and 10,000; these values are measured by the steric exclusion chromatographic technique (GPC) after dissolution in dimethylformamide, at room temperature. The GPC measurements are carried out on a 3-column WATERS microstyragel device $10^2$ nm, $10^3$ nm, $10^4$ nm, calibrated with polyethylene glycol standards. Detection is verified with a refractometer.

When the cross-linkable copolymer in accordance with the invention is to be used as a formulation base for protective coatings; i.e. a paint or varnish, it can possibly be used in its initial reaction solvent medium. It can also be more or less concentrated and put back into solution in a solvent which is more suitable for the desired type of paint or varnish. As such, the copolymer in solvent medium yields a transparent solvent. To this solution can be added the desired additives such as pigments, fillers, solvents, diluents, flow-modification agents, spreading agents, wetting agents, antifoaming agents, heat and light stabilizing agents, adhesion promotors, coresins or cross-linking hardening agents.

Among the pigments can be cited titanium dioxide, iron oxides, chrome oxide green, cobalt blue, chrome yellow, carbon black or corrosion-inhibiting pigments such as zinc phosphate and aluminum triphosphate.

Among the solvents or diluents can be cited the esters, the ketones, the propyleneglycol ethers and the aromatic compounds.

Among the coresins can be cited the acrylic resins, the polyesters, the polyethers and the epoxides.

Among the cross-linking hardening agents can be cited the possibly etherified melamine formaldehydes, the free or blocked isocyanates or polyisocyanates, and the organic acids or polyacids or their anhydrides.

The cross-linking temperature of these copolymers is generally between $-20°$ and $+270°$ C. and depends essentially on the nature of the hardening agent.

The cross-linking ability of these functional fluorinated copolymers is determined by means of a solvent-resistance test.

Cotton soaked in methylethylketone (MEK) is rubbed back and forth on the coating until appearance of the support.

A number of back-and-forth strokes greater than 50 demonstrates good cross-linking; a number of back-and-forth strokes greater than 100 demonstrates excellent cross-linking.

The varnishes or paints based on these copolymers can be applied by pneumatic or electrostatic spraying, by immersion, with a brush or with a roller. These copolymers can be applied to metals, wood, glass, plastics or even old coatings.

The invention will be further described in connection with the following examples which are set forth for purposes of illustration only.

EXAMPLE 1

Into a 3.3-liter autoclave equipped with effective means of agitation one introduces after deaeration under vacuum 2 L of tertiobutanol, 23 g of butylvinyl ether and 40 g of 3 allyloxy 1-2 propane diol. The temperature of the autoclave is then brought to 70° C. At this temperature, one adds 374 g of a $VF_2/C_2F_4$ mixture in 80/20 molar proportions. One then adds 10 g of tertiobutylperpivalate in solution in tertiobutanol. For each 97 g of the $VF_2/C_2F_4$ fluorinated monomer mixture in 65:35 proportions that is added, one introduces into the autoclave 8.5 g of butylvinyl ether and 15 g of 3 allyloxy 1-2 propane diol. 7.5 g of tertiobutyl perpivalate are added during the reaction after 1.5 hours and 3 hours of polymerization. After 6 hours 10 minutes of polymerization, the autoclave is cooled to room temperature and the residual monomers are degassed. The polymerization solvent is then distilled off under a strong vacuum.

After this treatment, one then collects 705 g of $VF_2/C_2F_4$/butylvinyl ether/3 allyloxy 1-2 propane diol copolymer.

The $VF_2$:$C_2F_4$ ratio in the copolymer is 64:36. For every 100 units of $VF_2/C_2F_4$, there are 8.5 units of butylvinyl ether and 7.6 units of allyloxy propane diol.

The inherent viscosity in DMF at 25° C. at a concentration of 1 g/dL is 0.224 dL/g; ($\overline{Mn}$) GPC=6350.

EXAMPLE 2

Into a 3.3-liter autoclave equipped with effective means of agitation one introduces after deaeration under vacuum 1.75 L of tertiobutanol and 0.25 L of methanol, 58 g of butylvinyl ether and 19 g of 3 allyloxy 1-2 propane diol. The temperature of the autoclave is then brought to 70° C. At this temperature, one adds 353 g of a $VF_2/C_2F_4$ mixture in 50:50 molar proportions. One then adds 5 g of tertiobutyl perpivalate in solution in a mixture of tertiobutanol and methanol solvent in the same proportions as at the beginning.

To maintain the pressure at 20 bars, one adds a $VF_2/C_2F_4$ mixture in 50:50 molar proportions. For every 106 g of $VF_2/C_2F_4$ fluorinated monomer mixture in 50:50 proportions that is added, one introduces into the autoclave 22 g of butylvinyl ether and 14 g of 3 allyloxy 1-2 propane diol. 2.5 g of tertiobutyl perpivalate are added during the reaction after 1.5 hours and 3 hours of polymerization. After 4 hours 35 minutes of polymerization, the autoclave is cooled to room temperature and the residual monomers are degassed. The polymerization solvent is then distilled off under a strong vacuum.

After this treatment one collects 740 g of $VF_2/C_2F_4$/butylvinyl ether/3 allyloxy 1-2 propane diol copolymer.

The $VF_2:C_2F_4$ molar ratio in the copolymer is 51:49. For every 100 fluorinated units of $VF_2/C_2F_4$, there are 26 units of butylvinyl ether and 7 units of allyloxy propane diol.

The inherent viscosity in DMF at 25° C. at a concentration of 1 g/dL is 0.132 dL/g.

EXAMPLE 3

Into a 3.3-liter autoclave equipped with effective means of agitation one introduces after deaeration under vacuum 1.75 L of tertiobutanol and 0.25 L of methanol, 46 g of butylvinyl ether and 40 g of 3 allyloxy 1-2 propane diol. The temperature of the autoclave is then brought to 70° C. At this temperature one adds 350 g of a $VF_2/C_2F_4$ mixture in 80:20 molar proportions. One then adds 10 g of tertiobutyl perpivalate in solution in a mixture of tertiobutanol and methanol solvent in the same proportions as at the beginning.

In order to maintain the pressure at 20 bars, one adds a $VF_2/C_2F_4$ mixture in the molar proportions 65:35. For every 100 g of $VF_2/C_2F_4$ fluorinated monomer mixture in 65:35 proportions that is added, one introduces into the autoclave 22 g of butylvinyl ether and 17 g of 3 allyloxy 1-2 propane diol. 7.5 g of tertiobutyl perpivalate are added during the reaction after 1.5 hours and 3 hours of polymerization. After 5 hours 45 minutes of polymerization, the autoclave is cooled to room temperature and the residual monomers are degassed. The polymerization solvent is then distilled off under a strong vacuum.

After this treatment, one collects 556 g of $VF_2/C_2F_4$/butylvinyl ether/3 allyloxy 1-2 propane diol copolymer.

The $VF_2:C_2F_4$ molar ratio in the copolymer is 65:35. For every 100 fluorinated units of $VF_2/C_2F_4$, there are 26 units of butylvinyl ether and 8.5 units of allyloxy propane diol.

The inherent viscosity in DMF at 25° C. at a concentration of 1 g/dL is 0.11 dL/g.

EXAMPLE 4

Into a 3.3-liter autoclave equipped with effective means of agitation one introduces after deaeration under vacuum 1.5 L of tertiobutanol and 0.5 L of methanol, 23 g of butylvinyl ether and 40 g of 3 allyloxy 1-2 propane diol. The temperature of the autoclave is then brought to 70° C. At this temperature one adds 270 g of a $VF_2/C_2F_4$ mixture in the molar proportions 80:20. One then adds 10 g of tertiobutyl perpivalate in solution in a mixture of tertiobutanol and methanol solvent in the same proportions as at the beginning.

In order to maintain the pressure at 20 bars, one adds a $VF_2/C_2F_4$ mixture in the molar proportions 65:35. To maintain the pressure at 20 bars, one adds a $VF_2/C_2F_4$ mixture in 65/35 molar proportions. For each 97 g of $VF_2/C_2F_4$ fluorinated monomer mixture in the proportions 65:35 that is added, one introduces into the autoclave 8.5 g of butylvinyl ether and 15 g of 3 allyloxy 1-2 propane diol. 10 g of tertiobutyl perpivalate are added during the reaction after 1.5 hours and 3 hours of polymerization. After 4 hours 45 minutes of polymerization, the autoclave is cooled to room temperature and the residual monomers are degassed. The polymerization solvent is then distilled off under a strong vacuum.

After this treatment, one collects 713 g of $VF_2/C_2F_4$/butylvinyl ether/3 allyloxy 1-2 propane diol copolymer.

The $VF_2:C_2F_4$ molar ratio in the copolymer is 63:37. For every 100 fluorinated units of $VF_2/C_2F_4$, there are 7.5 units of butylvinyl ether and 7.5 units of allyloxy propane diol.

The inherent viscosity in DMF at 25° C. at a concentration of 1 g/dL is 0.08 dL/g; $(\overline{Mn})$ (GPC)=1950.

EXAMPLE 5

Into a 3.3-liter autoclave equipped with effective means of agitation one introduces after deaeration under vacuum 1.75 L of tertiobutanol and 0.25 L of methanol, 58 g of butylvinyl ether and 19 g of 3 allyloxy 1-2 propane diol. The temperature of the autoclave is then brought to 70° C. At this temperature one adds 360 g of a $VF_2/C_2F_4/C_3F_6$ mixture in the molar proportions 45:45:13. One then adds 5 g of tertiobutyl perpivalate in solution in a mixture of tertiobutanol and methanol solvent in the same proportions as at the beginning.

In order to maintain the pressure at 20 bars, one adds a $VF_2/C_2F_4/C_3F_6$ mixture in the molar proportions 48:48:4. For each 106 g of $VF_2/C_2F_4/C_3F_6$ fluorinated monomer mixture in the proportions 47:47:6 that is added, one introduces into the autoclave 22 g of butylvinyl ether and 14 g of 3 allyloxy 1-2 propane diol. 3 g of tertiobutyl perpivalate are added during the reaction after 1.5 hours and 3 hours of polymerization. After 4 hours 50 minutes of polymerization, the autoclave is cooled to room temperature and the residual monomers are degassed. The polymerization solvent is then distilled off under a strong vacuum.

After this treatment, one collects 750 g of $VF_2/C_2F_4/C_3F_6$/butylvinyl ether/3 allyloxy 1-2 propane diol copolymer.

The $VF_2/C_2F_4/C_3F_6$ molar ratio in the copolymer is 47:48:5. For every 100 fluorinated units of $VF_2/C_2F_4$, there are 24 units of butylvinyl ether and 6.6 units of allyloxy propane diol.

The inherent viscosity in DMF at 25° C. at a concentration of 1 g/dL is 0.12 dL/g.

EXAMPLE 6

Into a 3.3-liter autoclave equipped with effective means of agitation one introduces after deaeration under vacuum 2 L of tertiobutanol and 17 g of ethylvinyl ether and 40 g of 3 allyloxy 1-2 propane diol. The temperature of the autoclave is then brought to 70° C. At this temperature one adds 370 g of a $VF_2/C_2F_4$ mixture in molar proportions 80:20. One then adds 10 g of tertiobutyl perpivalate in solution in tertiobutanol.

In order to maintain the pressure at 20 bars, one adds a $VF_2/C_2F_4$ mixture in molar proportions of 65:35. For each 97 g of $VF_2/C_2F_4$ fluorinated monomer mixture in the proportions 65:35 that is added, one introduces into the autoclave 6.1 g of ethylvinyl ether and 15 g of 3 allyloxy 1-2 propane diol. 7 g of tertiobutyl perpivalate are added during the reaction after 1.5 hours and 3 hours of polymerization. After 6 hours of polymerization, the autoclave is cooled to room temperature and the residual monomers are degassed. The polymerization solvent is then distilled off under a strong vacuum.

After this treatment, one collects 670 g of $VF_2/C_2F_4$/ethylvinyl ether/3 allyloxy 1-2 propane diol copolymer.

The $VF_2:C_2F_4$ molar ratio in the copolymer is 63:37. For every 100 fluorinated units of $VF_2/C_2F_4$, there are 8 units of ethylvinyl ether and 7.2 units of allyloxy propane diol.

The inherent viscosity in DMF at 25° C. at a concentration of 1 g/dL is 0.22 dL/g.

EXAMPLE 7

Into a 3.3-liter autoclave equipped with effective means of agitation one introduces after deaeration under vacuum 1.75 L of tertiobutanol and 0.25 L of methanol, 46 g of butylvinyl ether and 25 g of trimethylolpropanemonoallyl ether. The temperature of the autoclave is then brought to 70° C. At this temperature one adds 350 g of a $VF_2/C_2F_4$ mixture in the molar proportions of 80:20. One then adds 10 g of tertiobutyl perpivalate in solution in a tertiobutanol and methanol solvent mixture in the same proportions as at the beginning.

In order to maintain the pressure at 20 bars, one adds a $VF_2/C_2F_4$ mixture in the molar proportions 65:35. For each 100 g of $VF_2/C_2F_4$ fluorinated monomer mixture in the proportions 65:35 that is added, one introduces into the autoclave 17 g of butylvinyl ether and 11.4 g of trimethylolpropanemonoallyl ether. 7 g of tertiobutyl perpivalate are added during the reaction after 1.5 hours and 3 hours of polymerization. After 5 hours 40 minutes of polymerization, the autoclave is cooled to room temperature and the residual monomers are degassed. The polymerization solvent is then distilled off under a strong vacuum.

After this treatment, one collects 550 g of $VF_2/C_2F_4$/butylvinyl ether/trimethylolpropanemonoallyl ether copolymer.

The $VF_2:C_2F_4$ molar ratio in the copolymer is 63:37. For every 100 fluorinated units of $VF_2/C_2F_4$, there are 17 units of butylvinyl ether and 9 units of trimethylolpropanemonoallyl ether.

The inherent viscosity in DMF at 25° C. at a concentration of 1 g/dL is 0.105 dL/g.

EXAMPLE 8

Into a 3.3-liter autoclave equipped with effective means of agitation one introduces after deaeration under vacuum 2 L of tertiobutanol, 17 g of butylvinyl ether, 50 g of cyclohexylvinyl ether and 40 g of 3 allyloxy 1-2 propane diol. The temperature of the autoclave is then brought to 70° C. At this temperature, one adds 370 g of a $VF_2/C_2F_4$ mixture in the molar proportions 80:20. One then adds 10 g of tertiobutanol perpivalate in solution in tertiobutanol.

In order to maintain the pressure at 20 bars, one adds a $VF_2/C_2F_4$ mixture in the molar proportions of 65:35. For each 100 g of $VF_2/C_2F_4$ fluorinated monomer mixture in the proportions 65:35 that is added, one introduces into the autoclave 18.5 g of cyclohexylvinyl ether, 6.3 g of butylvinyl ether and 15 g of 3 allyloxy 1-2 propane diol. 6 g of tertiobutyl perpivalate are added during the reaction after 1.5 hours and 3 hours of polymerization. After 6 hours 30 minutes of polymerization, the autoclave is cooled to room temperature and the residual monomers are degassed. The polymerization solvent is then distilled off under a strong vacuum.

After this treatment, one collects 650 g of $VF_2/C_2F_4$/butylvinyl ether/cyclohexylvinyl ether/3 allyloxy 1-2 propane diol copolymer.

The $VF_2:C_2F_4$ molar ratio in the copolymer is 65:35. For every 100 fluorinated units of $VF_2/C_2F_4$, there are 7.5 units of butylvinyl ether, 17 units of cyclohexylvinyl ether and 7 units of allyloxy propane diol.

The inherent viscosity in DMF at 25° C. at a concentration of 1 g/dL is 0.25 dL/g.

EXAMPLE 9

Comparative

Into a 3.3-liter autoclave equipped with effective means of agitation one introduces after deaeration under vacuum 1.35 L of tertiobutanol and 0.45 L of methanol, 180 g of butylvinyl ether and 13.5 g of 3 allyloxy 1-2 propane diol. The temperature of the autoclave is then brought to 70° C. At this temperature, one adds 320 g of a $VF_2/C_2F_4$ mixture in the molar proportions 10:90. One then adds 2 g of tertiobutyl perpivalate in solution in a solvent mixture of tertiobutanol and methanol in the same proportions as at the beginning.

In order to maintain the pressure at 20 bars, one adds a $VF_2/C_2F_4$ mixture in the molar proportions 10:90. For each 115 g $VF_2/C_2F_4$ fluorinated monomer mixture that is added in the proportions 10:90, one introduces into the autoclave 74 g of butylvinyl ether and 14 g of 3 allyloxy 1-2 propane diol. 0.5 g of tertiobutyl perpivalate is added during the reaction after 1.5 hours of polymerization. After 3 hours of polymerization, the autoclave is cooled to room temperature and the residual momomers are degassed. The polymerization solvent is then distilled off under a strong vacuum.

After this treatment, one collects 920 g of $VF_2/C_2F_4$/butylvinyl ether/3 allyloxy 1-2 propane diol copolymer.

The $VF_2:C_2F_4$ molar ratio in the copolymer is 9:91. For every 100 fluorinated units of $VF_2/C_2F_4$, there are 91 units of butylvinyl ether and 6.5 units of allyloxy propane diol.

The inherent viscosity in DMF at 25° C. at a concentration of 1 g/dL is 0.223 dL/g.

EXAMPLE 10

The copolymer of Example 1 is solubilized in butyl acetate so as to obtain a 50% by weight dry extract solution.

A varnish is prepared by mixing with simple agitation 160 g of the fluorinated copolymer solution and 22 g of a solution of etherified melamine formaldehyde in solution at 90% by weight in isobutanol.

The mixture is applied in 100-μm strokes on a chromated aluminum test piece then baked for 30 minutes at 130° C. which yields a dry film with a thickness of 23 μm. The film obtained is subjected to the MEK back-and-forth strokes test and does not exhibit any visible change after 100 back-and-forth strokes. The film has a pencil surface hardness of F according to ASTM D3363-74 and a reflective brilliance of 70% measured according to ASTM D523-85.

EXAMPLE 11

The copolymer of Example 1 is solubilized in butyl acetate so as to obtain a 50% by weight solution of dry extract.

A varnish is prepared by mixed with simple agitation 120 g of the fluorinated copolymer solution and 18.9 g of a hexamethylenediisocyanate trimer and 1.3 g of dibutyltin dilaurate. Dilution with butyl acetate is carried out to reach a viscosity measured at 20° C. on DIN section number 4 of 22 seconds.

The mixture is applied with a pneumatic pistol on a phosphated galvanized steel plate.

The film, which is dry to the touch after 4 hours, is allowed to harden for 15 days at room temperature and yields a 20-μm film.

This film withstands 100 back-and-forth strokes with MEK without any changes. It exhibits a pencil hardness of F measured according to ASTM D3363-74 and a reflective brilliance of 60% measured according to ASTM D523-85.

EXAMPLE 12

The copolymer of Example 1 is solubilized in butyl acetate in a manner so as to obtain a 50% by weight solution of dry extract.

A pigment paste is prepared by mixing 210 g of fluorinated copolymer solution and 210 g of titanium dioxide.

Mixing is carried out in a ball mill for 30 minutes at 1500 rpm.

A white paint is prepared from this pigment paste. One mixes 210 g of the white pigment paste, 30 g of fluorinated copolymer solution, 15 g of a 90% by weight solution of an etherified melamine formaldehyde resin and 0.8 g of paratoluene sulfonic acid.

The white paint is applied in 125-μm strokes on a chromated aluminum plate which is baked for 30 minutes at 130° C. and yields a dry film with a thickness of 25 μm.

The paint obtained is subjected to the MEK back-and-forth test and does not exhibit any visible change after 100 back-and-forth strokes. It has a surface hardness of F according to ASTM D3363-74 and a reflective brilliance of 55% measured according to ASTM D523-85.

EXAMPLE 13

The copolymer of Example 2 is solubilized in butyl acetate so as to obtain a solution at 50% by weight of dry extract.

A varnish is prepared by mixing with simple agitation 160 g of the fluorinated copolymer solution and 22 g of a solution of etherified melamine formaldehyde in solution at 90% in isobutanol.

The mixture is applied with 100-μm strokes on a chromated aluminum test piece which is baked for 30 minutes at 130° C. and yields a dry film with a thickness of 23 μm.

The film obtained is subjected to the MEK back-and-forth test and does not exhibit any visible change after 100 back-and-forth strokes.

The film has a pencil surface hardness of H according to ASTM D3363-74 and a reflective brilliance of 70% measured according to ASTM D523-85.

EXAMPLE 14

The copolymer of Example 2 is solubilized in butyl acetate so as to obtain a solution at 50% by weight of dry extract.

A pigment paste is prepared by mixing:
190 g of fluorinated copolymer solution
17.6 g of titanium dioxide
63 g of cobalt blue
9.4 g of carbon black Mixing is carried out in a ball mill for 45 minutes at 1500 rpm.

A blue paint is prepared from this paste. One mixes 140 g of pigment paste, 28.6 g of fluorinated copolymer solution, 16 g of a hexamethylenediisocyanate trimer and 2 g of dibutyltin dilaurate.

The blue paint is applied with 125-μm strokes on a chromated aluminum plate which has previously been coated with an epoxy-based anticorrosive priming coat and then allowed to harden.

The film, which is dry to the touch after 4 hours, exhibits after 15 days at room temperature a pencil surface hardness of 2H according to ASTM D3363-74.

The blue paint obtained is subjected to the MEK back-and-forth test and does not exhibit any visible change after 100 back-and-forth strokes. It has a reflective brilliance of 40% measured according to ASTM D523-85.

EXAMPLE 15

The copolymer of Example 3 is solubilized in butyl acetate so as to obtain a solution at 50% by weight of dry extract.

A varnish is prepared by mixing with simple agitation 140 g of the fluorinated copolymer solution and 25 g of a hexamethylenediisocyanate trimer and 1.7 g of dibutyltin dilaurate.

Dilution with butyl acetate is carried out to obtain a viscosity on DIN section number 4 of 22 seconds measured at 20° C.

The mixture is applied with a pneumatic pistol on a phosphated galvanized steel plate. The film, which is dry to the touch after 4 hours, is allowed to harden for 15 days at room temperature and yields a dry film with a thickness of 20 μm.

This film undergoes 100 MEK back-and-forth strokes without any change. It exhibits a pencil hardness of HB measured according to ASTM D3363-74 and a reflective brilliance of 70% measured according to ASTM D523-85.

EXAMPLE 16

The copolymer of Example 3 is solubilized in butyl acetate so as to obtain a solution at 50% of dry extract.

A pigment paste is prepared by mixing 160 g of fluorinated copolymer solution and 160 g of titanium dioxide.

Mixing is carried out in a ball mill for 30 minutes at 1500 rpm.

A white paint is prepared in the following manner:
One mixes 160 g of white pigment paste, 22.8 g of fluorinated copolymer solution, 11 g of a 90% solution of an etherified melamine formaldehyde resin and 0.5 g of paratoluene sulfonic acid.

The white paint is applied with 125-μm strokes on an aluminum plate which is baked for 30 minutes at 130° C. to yield a dry film with a thickness of 25 μm.

The paint obtained is subjected to the MEK back-and-forth test. It does not exhibit any visible change after 100 back-and-forth strokes. It has a pencil surface hardness of 2H according to ASTM D3363-74 and a reflective brilliance of 75% measured according to ASTM D523-85.

EXAMPLE 17

The copolymer of Example 4 is solubilized in butyl acetate so as to obtain a solution at 50% by weight of dry extract.

A varnish is prepared by mixing with simple agitation 160 g of the fluorinated copolymer solution and 22 g of a solution of etherified melamine formaldehyde in solution at 90% by weight in isobutanol.

The mixture is applied with 100-μm strokes to a chromated aluminum test piece which is baked for 30 minutes at 130° C. to yield a dry film with a thickness of 23 μm.

The film obtained is subjected to the MEK back-and-forth test and does not exhibit any visible change after 100 back-and-forth strokes. The film has a pencil surface hardness of 2H according to ASTM D3363-74 and a reflective brilliance of 75% measured according to ASTM D523-85.

EXAMPLE 18

The copolymer of Example 4 is solubilized in butyl acetate so as to obtain a solution at 50% by weight of dry extract.

A pigment paste is prepared by mixing:
171 g of fluorinated copolymer solution
15.8 g of titanium dioxide
56.7 g of cobalt blue
8.5 g of carbon black Mixing is carried out in a ball mill for 30 minutes at 1500 rpm.

A blue paint is prepared from this paste. One mixes 126 g of pigment paste, 32 g of a fluorinated copolymer solution, 21.3 of a hexamethylenediisocyanate trimer and 0.9 g of dibutyltin dilaurate.

The blue paint is applied with 125-μm strokes on a chromated aluminum plate which has previously been coated with an epoxy-based anticorrosive primary coat and then allowed to harden.

The film, which is dry to the touch after 4 hours, exhibits after 15 days at room temperature a pencil surface hardness of 3H according to ASTM D3363-74. The blue paint obtained is subjected to the MEK back-and-forth test; it does not exhibit any visible change after 100 back-and-forth strokes. It has a reflective brilliance of 43% measured according to ASTM D523-85.

EXAMPLE 19

The copolymer of Example 19 is solubilized in butyl acetate so as to obtain a solution at 50% by weight of dry extract.

A varnish is prepared by mixing with simple agitation 140 g of fluorinated copolymer solution and 22 g of a hexamethylenediisocyanate trimer and 1.4 g of dibutyltin dilaurate.

Dilution with butyl acetate is carried out until reaching a viscosity on DIN section number 4 of 22 seconds measured at 20° C.

The mixture is applied with a pneumatic pistol on a phosphated galvanized steel plate and allowed to harden for 15 days at room temperature which yields a dry film with a thickness of 20 μm.

The film remains slightly sticky to the touch. It is subjected to the MEK resistance test. The support can be seen after 20 back-and-forth strokes.

It exhibits a pencil hardness of only 5B measured according to ASTM D3363-74, which corresponds to imperfect cross-linking. In addition, the film has a very pronounced milky appearance.

EXAMPLE 20

The copolymer of Example 9 is solubilized in butyl acetate so as to obtain a solution at 50% by weight of dry extract.

A pigment paste is prepared by mixing 200 g of fluorinated copolymer solution and 200 g of titanium dioxide.

Mixing is carried out in a ball mill for 30 minutes at 1500 rpm.

White paints are prepared from this paste. One mixes 140 g of white pigment paste, 20 g of a fluorinated copolymer solution and 0.5 g of paratoluene sulfonic acid. One adds the following to four of these mixtures.

a. 10 g of a 90% solution of an etherified melamine formaldehyde resin
b. 12.5 g of the same melamine resin solution
c. 16.7 g of the same melamine resin solution
d. 21.4 g of the same melamine resin solution.

The four white paints are applied with 125-μm strokes to a chromated aluminum plate and then baked for 30 minutes at 130° C. so as to obtain dry films with a thickness of 25 μm.

The paints obtained are subjected to the methylethylketone resistance test and to pencil hardness testing according to ASTM D3363-74 with the following results.

|  | a | b | c | d |
| --- | --- | --- | --- | --- |
| Back-and-forth strokes | 34 | 49 | 28 | 14 |
| Pencil hardness | 4B | 3B | 4B | 5B |

The results demonstrate imperfect cross-linking of the paint. In addition, the films remained very slightly sticky to the touch.

EXAMPLE 21

The copolymer of Example 5 is solubilized in butyl acetate so as to obtain a solution at 50% by weight of dry extract.

A varnish is prepared by mixing with simple agitation 120 g of the fluorinated copolymer solution and 14.9 g of a hexamethylenediisocyanate trimer and 1.3 g of dibutyltin dilaurate. Dilution is carried out with butyl acetate until obtaining a viscosity on DIN section number 4 of 22 seconds measured at 20° C.

The mixture is applied with a pneumatic pistol to a phosphated galvanized steel. The film, which is dry to the touch after 4 hours, is allowed to harden for 15 days at room temperature and yields a dry film with a thickness of 20 μm.

This film undergoes without any change 100 back-and-forth strokes with MEK. It exhibits a pencil hardness of HB measured according to ASTM D3363-74 and a reflective brilliance of 40% measured according to ASTM D523-85.

EXAMPLE 22

The copolymer of Example 5 is solubilized in butyl acetate so as to obtain a solution at 50% by weight of dry extract.

A pigment paste is prepared by mixing 130 g of fluorinated copolymer solution and 130 g of titanium dioxide.

Mixing is carried out in a ball mill for 30 minutes at 1500 rpm.

A white paint is prepared from this paste. One mixes 140 g of white pigment paste, 20 g of a fluorinated copolymer solution, 10 g of a 90% by weight solution of etherified melamine formaldehyde resin and 0.8 g of paratoluene sulfonic acid.

The white paint is applied with 125-μm strokes on a chromated aluminum plate and then baked for 30 minutes at 130° C. which yields a dry film with a thickness of 25 μm.

The paint obtained is subjected to the MEK back-and-forth test; it does not exhibit any visible change after 100 back-and-forth strokes. It has a surface hardness of F according to ASTM D3363-74 and a reflective brilliance of 45% measured according to ASTM D523-85.

EXAMPLE 23

The copolymer of Example 6 is solubilized in butyl acetate so as to obtain a solution at 50% by weight of dry extract.

A varnish is prepared by mixing with simple agitation 160 g of the fluorinated copolymer solution and 22 g of a solution of etherified melamine formaldehyde in solution at 90% in isobutanol.

The mixture is applied with 100-μm strokes to a chromated aluminum test piece and then baked for 30 minutes at 130° C. to yield a dry film with a thickness of 23 μm.

The film obtained is subjected to the MEK back-and-forth test; it does not show any visible change after 100 back-and-forth strokes. The film has a pencil surface hardness of F measured according to ASTM D3363-74 and a reflective brilliance of 38% measured according to ASTM D523-85.

EXAMPLE 24

The copolymer of Example 7 is solubilized in butyl acetate so as to obtain a solution at 50% by weight of dry extract.

A varnish is prepared by mixing with simple agitation 140 g of the fluorinated copolymer solution and 12 g of a hexamethylenediisocyanate trimer and 1 g of dibutyltin dilaurate. Dilution with butyl acetate is carried out until reaching a viscosity on DIN section number 4 of 22 seconds measured at 20° C.

The mixture is applied with a pneumatic pistol on a phosphated galvanized steel plate. The film, which is dry to the touch after 4 hours, is allowed to harden for 15 days at room temperature and yields a dry film with a thickness of 20 μm.

The film undergoes 100 back-and-forth strokes with MEK without change. It exhibits a pencil hardness of F measured according to ASTM D3363-74 and a reflective brilliance of 45% measured according to ASTM D523-85.

EXAMPLE 25

The copolymer of Example 8 is solubilized in butyl acetate so as to obtain a solution at 50% by weight of dry extract.

A varnish is prepared by mixing with simple agitation 160 g of the fluorinated copolymer solution and 22 g of a solution of etherified melamine formaldehyde in solution at 90% in isobutanol.

The mixture is applied with 100-μm strokes on a chromated aluminum test piece and then baked for 30 minutes at 130° C. which yields a dry film with a thickness of 23 μm.

The film obtained is subjected to the MEK back-and-forth test and does not exhibit any visible changes after 100 back-and-forth strokes. The film exhibits a pencil surface hardness of H measured according to ASTM D3363-74 and a reflective brilliance of 58% measured according to ASTM D523-85.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A cross-linkable copolymer containing the copolymerization radicals of a fluorinated monomer, a hydroxylated allyl ether and a vinyl ether, wherein:
   (a) the fluorinated monomer radicals originate from the association of vinylidene fluoride and tetrafluoroethylene,
   (b) the allyl ether radicals originate from a compound of the formula:

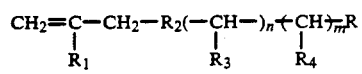

wherein R is $CH_2OH$; $R_1$ being: H or $CH_3$; $R_2$ is

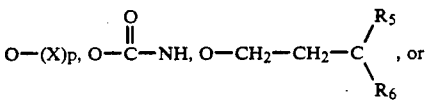

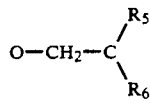

with "p" being a number selected from 0 to 3, X being $(CH_2)q-O$ with "q" a number selected from 1 to 3, and $R_5$ and $R_6$, (which can be identical or different) being:
   $CH_2OH$, $CH_2-CH_2-OH$, $CH_3$, $C_2H_5$; $R_3$ and $R_4$ being H or OH, but not simultaneously H; and "n" and "m", (which can be identical or different) being numbers selected from 0 to 2; and
   (c) the vinyl ether radical originate from a compound of the formula:
   $CH_2=CH-O-R_7$, wherein $R_7$ is a linear or branched alkyl radical containing 2 to 8 carbon atoms or a cyclic radical.

2. The cross-linkable copolymer of claim 1, wherein the association for 100 moles of the two fluorinated monomers is constituted of:
   (i) 75 to 25 moles of vinylidene fluoride, and
   (ii) 75 to 25 moles of tetrafluoroethylene.

3. The cross-linkable copolymer of claim 2, wherein it comprises radicals originating from:
   (i) 75 to 25 moles of vinylidene fluoride,
   (ii) 75 to 25 moles of tetrafluoroethylene,
   (iii) 4 to 15 moles of allyl ether per 100 moles of the total of the two fluorinated monomers, and
   (iv) 3 to 35 moles of vinyl ether per 100 moles of the total of the two fluorinated monomers.

4. The cross-linkable copolymer of claim 3, wherein its intrinsic viscosity in dimethylformamide at 25° C. at a concentration of 1 g/dL is within the range from 0.06 to 0.9 dL/g.

5. The cross-linkable copolymer of claim 4, wherein it contains radicals from a third fluorinated monomer, which does not contain chlorine in its molecule, in an amount such that, calculated on a monomer basis, it does not represent more than 15 moles per 100 moles of the total of the two monomers, vinylidene fluoride and tetrafluoroethylene.

6. The cross-linkable copolymer of claim 5, wherein the third monomer is hexafluoropropene.

7. The cross-linkable copolymer of claims 1 to 6, wherein it is in solution in an organic solvent.

* * * * *